United States Patent [19]
Van Zon et al.

[11] 3,826,352
[45] July 30, 1974

[54] SPIRAL COLUMN FOR ENDLESS CHAIN CONVEYOR

[75] Inventors: Jacob Van Zon, Port Hope, Ontario; Russel J. Lake, Cobourg, Ontario, both of Canada

[73] Assignee: Rexnord Inc., Milwaukee, Wis.

[22] Filed: Oct. 27, 1972

[21] Appl. No.: 301,566

[52] U.S. Cl. ............................................. 198/136
[51] Int. Cl. .................................................. B65g 15/00
[58] Field of Search ................... 198/136, 212, 204; 211/177, 163

[56] References Cited
UNITED STATES PATENTS
| | | | |
|---|---|---|---|
| 1,089,290 | 3/1914 | Thompson | 211/177 |
| 1,137,900 | 5/1915 | Reichert | 211/163 |
| 3,332,538 | 7/1967 | Rice | 198/204 |
| 3,638,814 | 2/1972 | Lowery | 211/177 |

FOREIGN PATENTS OR APPLICATIONS
330,546   8/1903   France .............................. 198/136

*Primary Examiner*—Richard E. Aegerter
*Attorney, Agent, or Firm*—Sughrue, Rothwell, Mion, Zinn & Macpeak

[57] ABSTRACT

A hollow steel upright cylinder is provided with a series of projecting round rods forming a spiral. The brackets which support the spiral track for the conveyor and an outer spiral guide are assembled and supported by the rods with intermediate lengths of tubing. The track and guide are radially positioned uniformly and readily by the predetermined lengths of the tubing. The ends of each rod are threaded and fitted with nuts to secure the parts on the rod.

8 Claims, 4 Drawing Figures

SPIRAL COLUMN FOR ENDLESS CHAIN CONVEYOR

BACKGROUND OF THE INVENTION

Field of the invention: The endless article-carrying conveyor comprises a series of links having flat tops for the support of the articles such as shown in U.S. Pat. No. 2,954,113. The trough structure supporting such chain is generally horizontal only.

Background of the invention: The design and construction of spiral towers or columns for such chain conveyors has always been somewhat difficult and required considerable floor-fitting during the welding and assembly of the column. An object of the present invention and assembly is to provide relatively uncomplicated parts which are quickly and easily constructed to form a vertical spiral.

SUMMARY OF THE INVENTION

The construction of the column requires only the spiral bending of two chain track strips and the outer guide for the articles. The hollow cylindrical steel column forms the inner guide although an inner spiral might be provided and supported by the projecting rods. The spiral is constructed by inserting the rods in holes formed in the column and assembling the track brackets and the outer guide on the rods with intermediate tubes. The chain track strips may be welded to the brackets before or after their assembly on the rods.

DESCRIPTION OF PREFERRED EMBODIMENT

Figure 1:
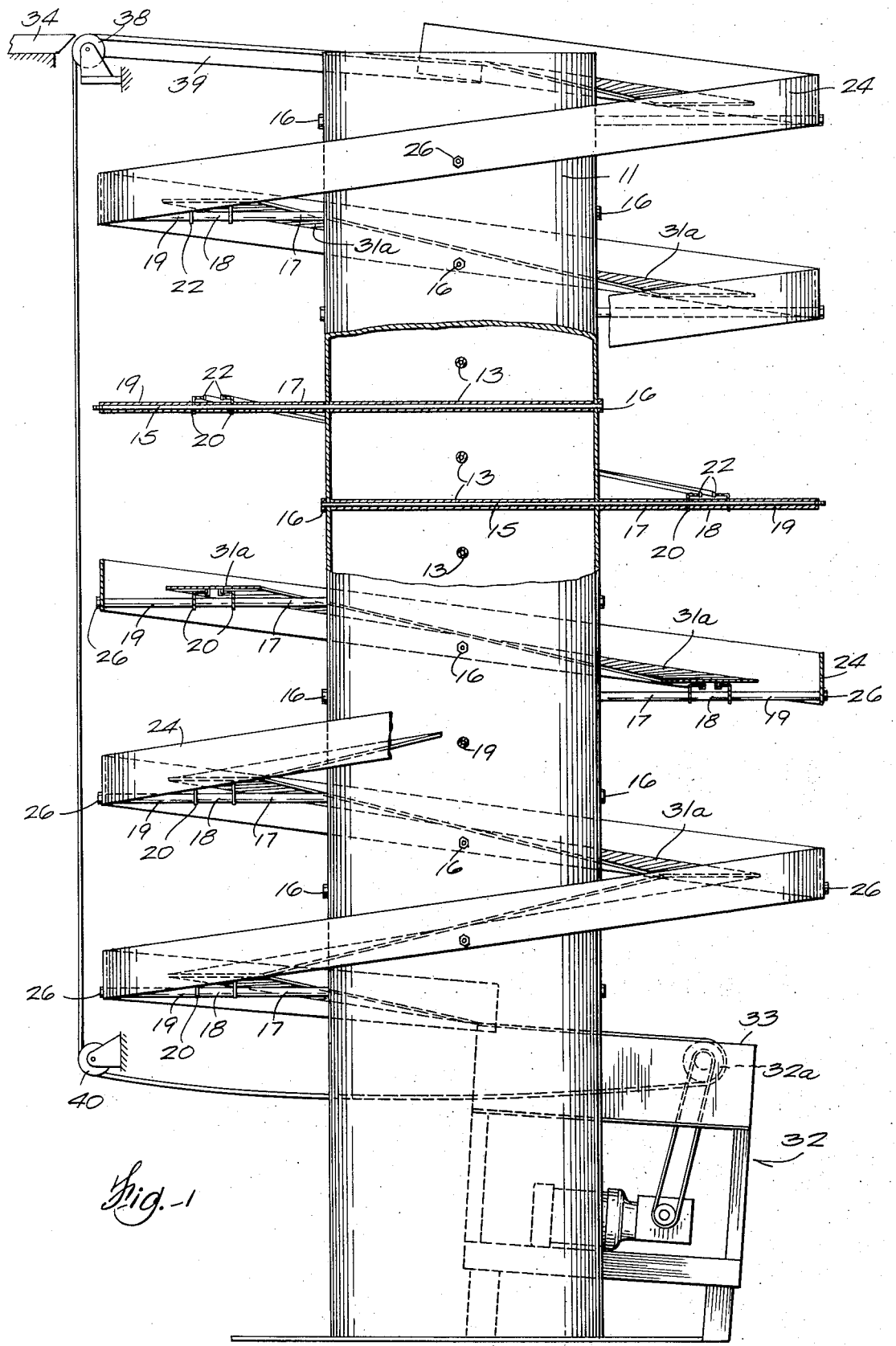
FIG. 1 is a side elevation of the column with parts broken away and sectioned. The downward return run of the conveyor is at the left.

The spiral column as shown, is a lightweight, steel pipe or cylinder 11 which is cut to the desired height and drilled with two oppositely paired series of holes. The two series are offset a distance equal to one-fourth of the pitch of the spiral. The tubes 13 extending fully across the column interior may be dispensed with but serve to support and allow the use of a lighter gauge or thickness of the wall of cylinder 11. Each tube 13 is positioned in alignment with two opposite holes through which a rod is then extended. The ends of the rod are threaded and one nut 16 is located directly against one side of the cylinder. The three outer tubes 17, 18, and 19 are then assembled on the oppositely extending section of rod 15 with the brackets 20 therebetween so that the two brackets 20 are oppositely disposed and spaced by tube 18. Tubes 17 and 19 are of the same length. The two brackets 20 are L-shaped with their horizontal legs extending toward each other and their downward legs provided with holes through which the rod is extended.

The spiral conveyor track comprises the parallel steel strips 22 of rectangular section. Strips 22 may be welded at intervals to the ends of the horizontal legs of the several brackets 20 prior to their assembly on the rods 15. Alternatively, the strips are added after all the brackets 20 are securely positioned on all of the rods.

The outer steel guide 24 shown in FIG. 1 is of a moderate gauge steel strip which is supported at intervals by the ends of rods 15 which project through holes punched in the strip. As guide 24 is assembled on the rods, preferably between washers, the end nuts 26 are turned on the rods and both nuts 16 and 26 are then tightened.

Upon completion of the assembly and using quick acting hand clamps, not shown, the two strips 22 may then be located between the brackets 20 of each rod and welded thereto. This completes the assembly of the spiral column.

Figure 2:
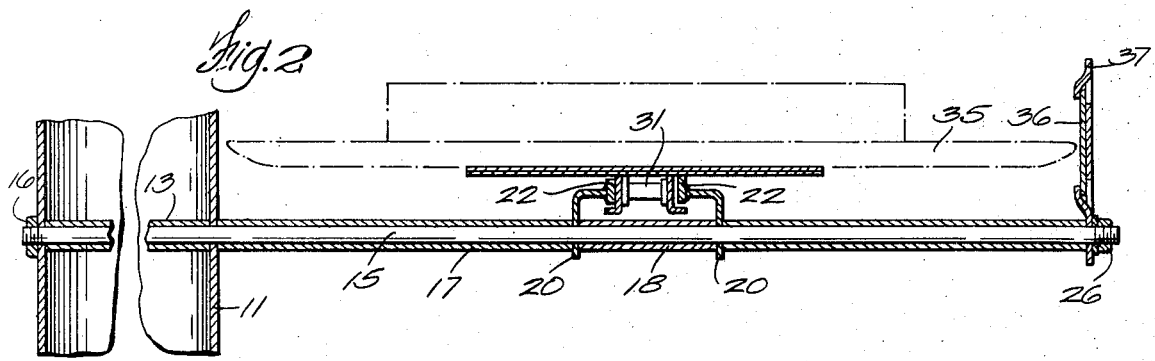
FIG. 2 is an enlarged front view of one rod assembly with parts broken away and sectioned. The articles carried by the chain are shown with broken lines. The outer guide strip is here carried by a clip assembled on the end of the rod.
Figure 3:
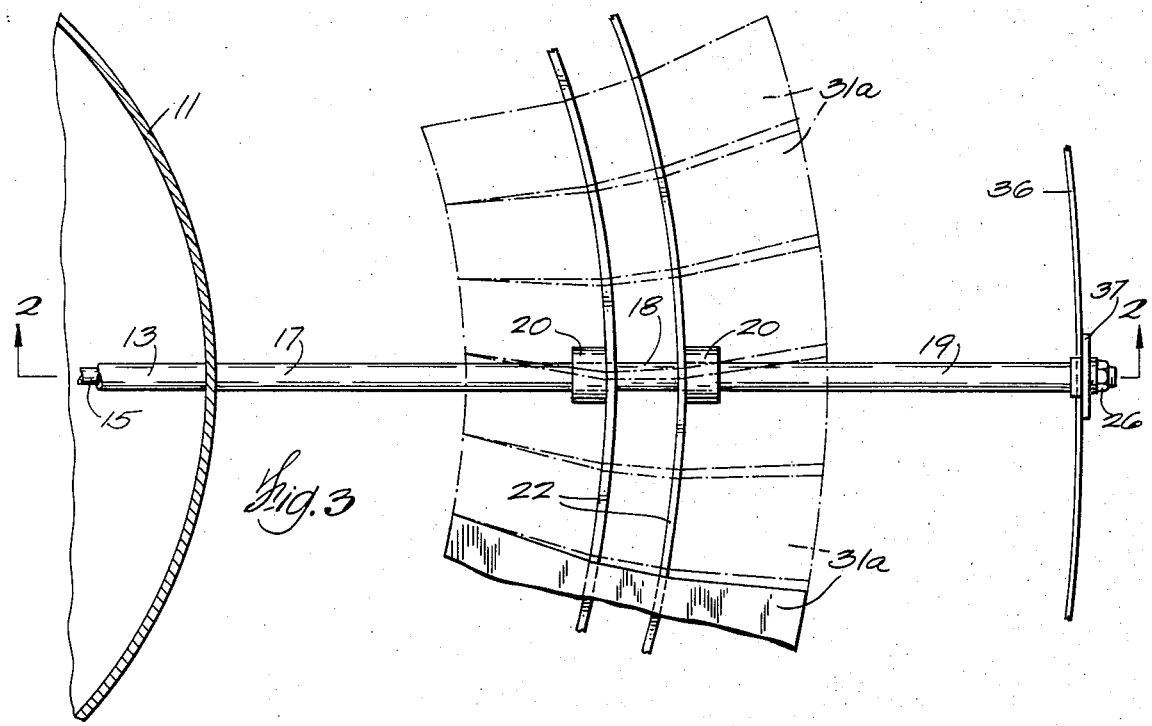
FIG. 3 is a plan view of the assembly of FIG. 2. The conveyor chain is shown with broken lines.

A complete conveyor for carrying food serving trays from an upper to a lower level is shown in FIG. 1 as an example of the use of such a conveyor. The conveyor includes the conveyor chain 31, the lower drive 32, and discharge station 33 and the upper loading platform 34. Chain 31 comprises a series of links which fit between track strips 22 and carry the laterally extending top plates 31a which slide on the top surface of strips 22. The trays, such as tray 35 shown in broken lines in FIG. 2, fit between cylinder 11 and the outer guide 36 and rest on the top plates 31a. In FIGS. 2 and 3 the outer guide 36 comprises a metal strip which is supported at intervals by upright clips including clip 37 having a lower hole through which the rod 15 extends. The guide 36 may be spot welded to the clips or variously secured other than as shown. Alternatively also, each group of clips which are in vertical alignment on the corresponding ends of the rods may comprise a single vertical member, not shown, which then serves to join the ends of such rods.

The downward run of the chain 31 extends from the upper idler 38 located at the edge of the upper loading platform 34. The short straight track support section 39 carries the chain from idler 38 to the upper ends of track strips 22.

Chain 31 operates over and is driven by the sprocket 32a and hangs in an inverted position between sprocket 32a and the lower return idler 40 which directs the return run upwardly to idler 38. Alternatively, the chain may be driven by drive means located at the position of upper idler 38.

Figure 4:
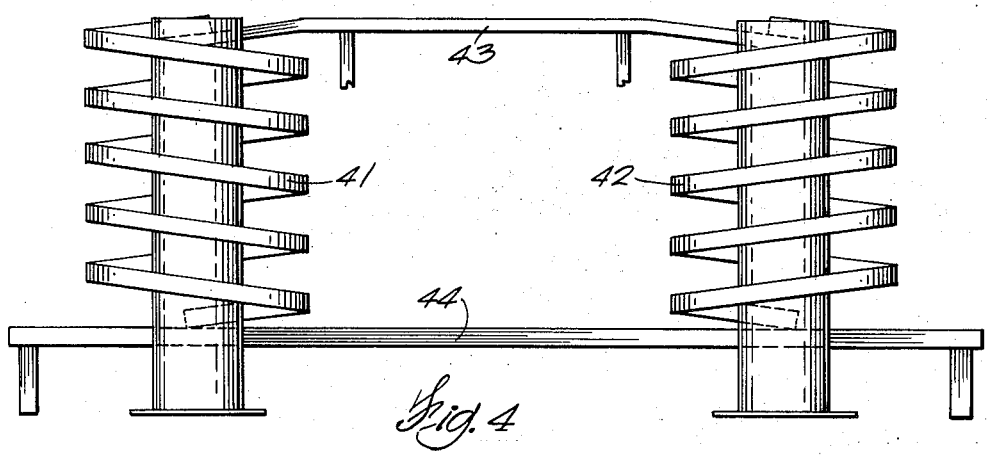
FIG. 4 is a side view showing one column for the upward run of the conveyor and a second column for the downward run.

A conveyor comprising the two spirals 41 and 42 and the upper and lower connecting runs 43 and 44 is shown in FIG. 4. The spirals are of opposite direction but of identical construction except for the outer guide and the two track strips. The opposite spiral is readily provided because the holes are arranged as described and the rods may be extended in either direction from the column.

We claim:

1. A spiral chain conveyor having a conveyor chain movable in a spiral path and a column for the support of the conveyor chain, spaced parallel chain track strips also supported from the column, said column comprising: a stationary upright cylindrical sheet having a series of oppositely disposed pairs of holes positioned to form a spiral path which defines and corresponds with the spiral of the conveyor, a plurality of rigid rods each supported by the cylinder, one in each of the oppositely disposed pair of holes, each rod having an inner section extending across the interior of the cylinder and an outer projecting section, and a series of brackets assembled on the outer projecting rod sections and secured to and supporting said track strips for carrying the spiral conveyor chain in the spiral path, and an outer spiral chain guide strip carried by the outer ends of the rods.

2. The column of claim 1 wherein the guide strip has a series of holes through which the rods extend.

3. The column of claim 1 which further includes means assembled on each rod and which space said brackets from the cylinder.

4. The invention of claim 3 wherein said means comprises a series of tubes through which the rod extends.

5. The column of claim 3 which further includes a tube on each rod and extending across the interior of the cylinder and securement means on each end of the rod.

6. The column of claim 2 which further includes a number of tubes assembled on each rod and securement means on the ends of the rods, one of the tubes extending across the interior of the cylinder and the other tubes serving to space the track strips and outer guide from the cylinder.

7. The column of claim 5 wherein the securement means are threaded on the ends of the rod and serve to clamp the tubes and parts therebetween on the rod to form a rigid assembly.

8. The column of claim 6 wherein the securement means are threaded on the ends of the rod and serve to clamp the tubes and parts therebetween on the rod to form a rigid assembly.

* * * * *